United States Patent
Campbell et al.

(12)

(10) Patent No.: US 8,825,389 B1
(45) Date of Patent: Sep. 2, 2014

(54) MOBILITY DEVICE AND METHOD FOR GUIDING THE VISUALLY IMPAIRED

(71) Applicants: Terry L. Campbell, San Antonio, TX (US); Eric K. Karich, Aliso Viejo, CA (US)

(72) Inventors: Terry L. Campbell, San Antonio, TX (US); Eric K. Karich, Aliso Viejo, CA (US)

(73) Assignee: Terry L. Campbell, San Antonio, TX (US)

( * ) Notice: Subject to any disclaimer, the term of this patent is extended or adjusted under 35 U.S.C. 154(b) by 0 days.

(21) Appl. No.: 13/748,086

(22) Filed: Jan. 23, 2013

(51) Int. Cl.
   *G01C 21/00* (2006.01)
   *G01C 21/34* (2006.01)
   *G08G 1/123* (2006.01)

(52) U.S. Cl.
   USPC .......................................... 701/434; 701/433

(58) Field of Classification Search
   USPC .................................................. 701/433, 434
   See application file for complete search history.

(56) References Cited

U.S. PATENT DOCUMENTS

| | | | | |
|---|---|---|---|---|
| 3,546,467 A | * | 12/1970 | Benham et al. | 250/215 |
| 4,280,204 A | * | 7/1981 | Elchinger | 367/116 |
| 5,724,313 A | * | 3/1998 | Burgess et al. | 367/116 |
| 6,745,786 B1 | * | 6/2004 | Davis | 135/65 |
| 7,706,212 B1 | * | 4/2010 | Campbell | 367/116 |
| 7,991,576 B2 | * | 8/2011 | Roumeliotis | 702/159 |
| 8,214,081 B2 | | 7/2012 | Choi | |

FOREIGN PATENT DOCUMENTS

| | | |
|---|---|---|
| FR | 2940494 A1 | 7/2012 |
| FR | 2976704 A1 | 12/2012 |

* cited by examiner

*Primary Examiner* — Mary Cheung
*Assistant Examiner* — Frederick Brushaber
(74) *Attorney, Agent, or Firm* — Eric Karich

(57) ABSTRACT

A mobility device has an elongate handle housing that includes an electronic directing system that comprises a computer microcontroller operably connected with a transceiver for communicating with an electronic beacon. The mobility device may be used to trigger an audible signal from the electronic beacon to guide a visually impaired person to the electronic beacon at a desired location. The mobility device may further include a laser detection apparatus for directing the visually impaired person around obstructions.

5 Claims, 3 Drawing Sheets

MOBILITY DEVICE AND METHOD FOR GUIDING THE VISUALLY IMPAIRED

BACKGROUND OF THE INVENTION

1. Field of the Invention

This invention relates generally to mobility devices, and more particularly to a mobility device for a visually impaired person.

2. Description of Related Art

Elchinger, U.S. Pat. No. 4,280,204, teaches a conventional cane for the blind that includes a dual-mode, ultrasonic obstacle detection sensor. The size of the protective zone associated with the sensor is variable. In one mode, the sensor warns of low lying objects that might contact the upper extremities of the user. In another mode, the user can determine the presence or absence of more remote objects. The user is warned of the presence of objects within the zone by an audible warning.

There is a need in the art for a mobility device that simulates the function of a cane, but that is small, compact, and easy to use, and which does not physically touch the surroundings while being used.

There is also a need in the art to actively guide a visually impaired person to a desired location, such as a restroom. It is often embarrassing to have to ask for directions to a restroom, and particularly to the entrance of either the male or female restroom, and there is no prior art method of ascertaining this information in any other way.

The prior art does not teach a mobility device that utilizes a laser pulse device to provide a user with controlled detection of obstacles in a manner similar to that of a standard cane. The prior art also does not teach a mobility device that will direct the visually impaired person to a desired location. The present invention fulfills these needs and provides further advantages as described in the following summary.

SUMMARY OF THE INVENTION

The present invention teaches certain benefits in construction and use which give rise to the objectives described below.

The present invention provides a mobility device for directing a visually impaired person.

The mobility device comprises an elongate handle housing having an outer surface adapted to be grasped by the visually impaired person. In one embodiment, the mobility device may further include an electronic directing system operably mounted in the handle housing of the mobility device. The electronic directing system comprises a computer microcontroller operably connected with a transceiver for communicating with an electronic beacon, to trigger an audible signal from the electronic beacon to guide the visually impaired person to the electronic beacon and the desired location.

In one embodiment, the mobility device may further include a laser detection apparatus operably mounted in the handle housing of the mobility device for detecting the presence of the obstacle. The laser detection apparatus comprises a transmitter operably connected with the computer microcontroller, a laser diode operably connected with the transmitter for transmitting a laser pulse responsive to the transmitter; and further includes an optical detector for receiving a reflected pulse reflected from the obstacle, and a receiver operably connected with the optical detector and also operably connected with the computer microcontroller for transmitting a signal to the computer microcontroller upon receipt of the reflected pulse, so that the computer microcontroller can determine a distance that the laser pulse travelled before being reflected. The mobility device may further include a plurality of vibrating tactile transmitters arrayed on the outer surface of the handle for indicating to the visually impaired person the distance to the obstacle from the laser detection apparatus.

A primary objective of the present invention is to provide a mobility device having advantages not taught by the prior art.

Another objective is to provide a mobility device that can direct a visually impaired person to a desired location, even in a public place such as a public restroom.

A further objective is to provide a mobility device that is small, unobtrusive, and yet able to detect obstacles and assist the visually impaired person in avoiding the obstacles.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a mobility device 10 for use by a visually impaired person 12. The mobility device 10 is designed to enable the visually impaired user to be more aware of his surroundings within specific areas, alert the visually impaired person 12 of obstacles in his or her path, and to also guide the visually impaired person 12 to a desired location 50.

Figure 1:
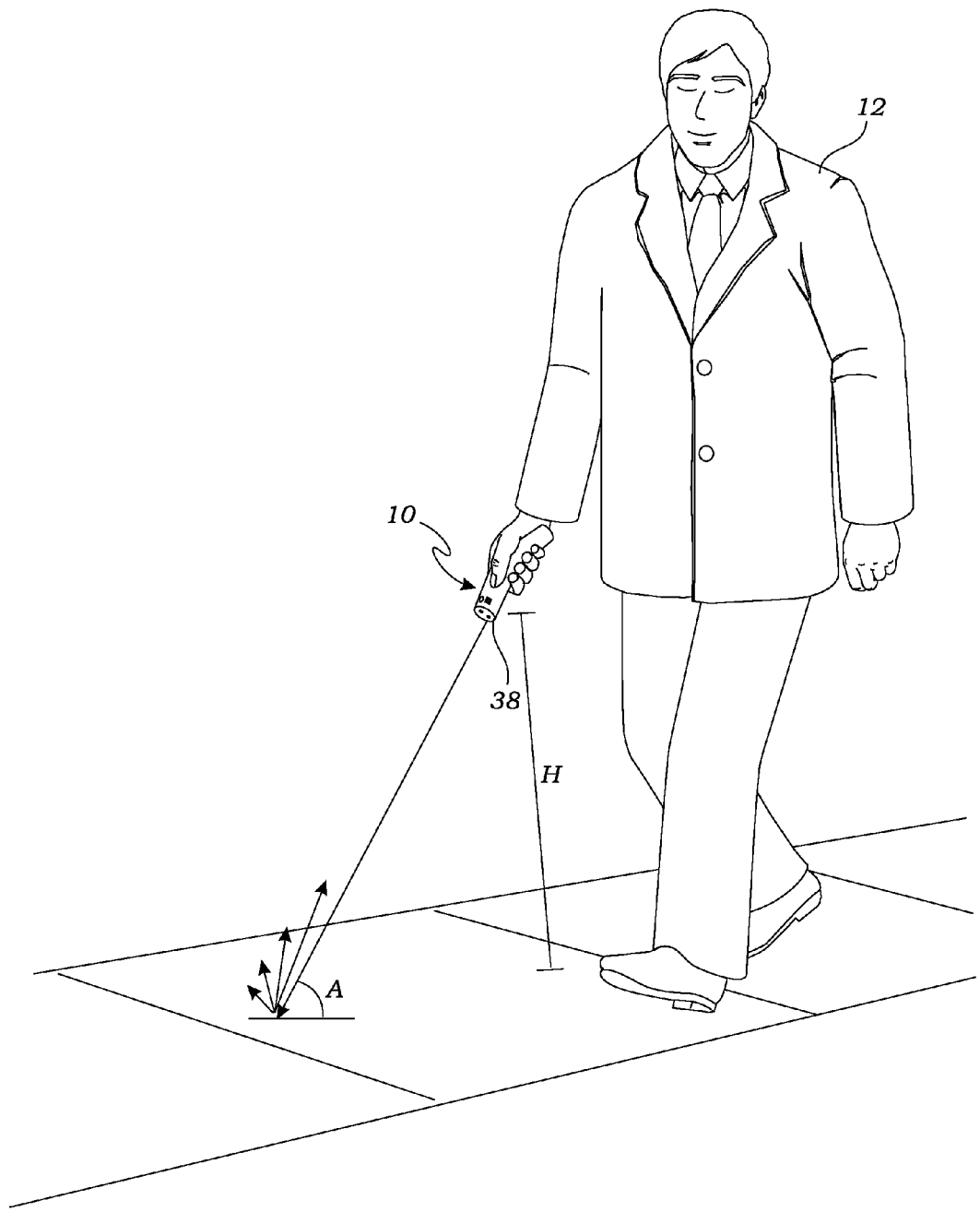
FIG. 1 is a perspective view of a visually impaired person using a mobility device according to one embodiment of the present invention.
Figure 2:
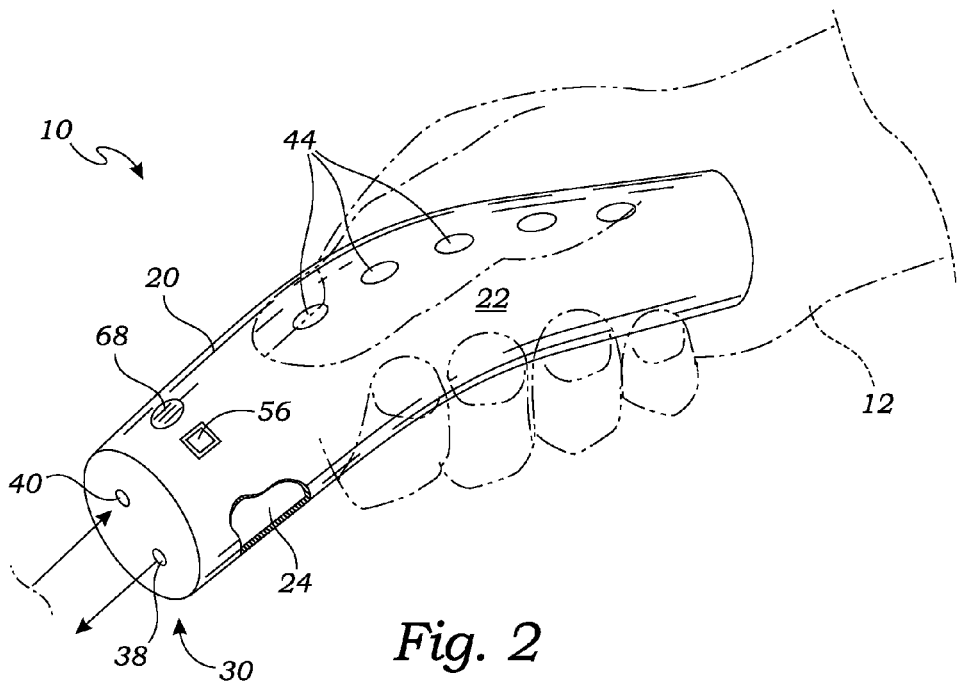
FIG. 2 is a perspective view of the mobility device of FIG. 1.

FIG. 1 is a perspective view of a visually impaired person 12 using one embodiment of the mobility device 10. FIG. 2 is a perspective view of the mobility device 10 of FIG. 1.

Figure 3:
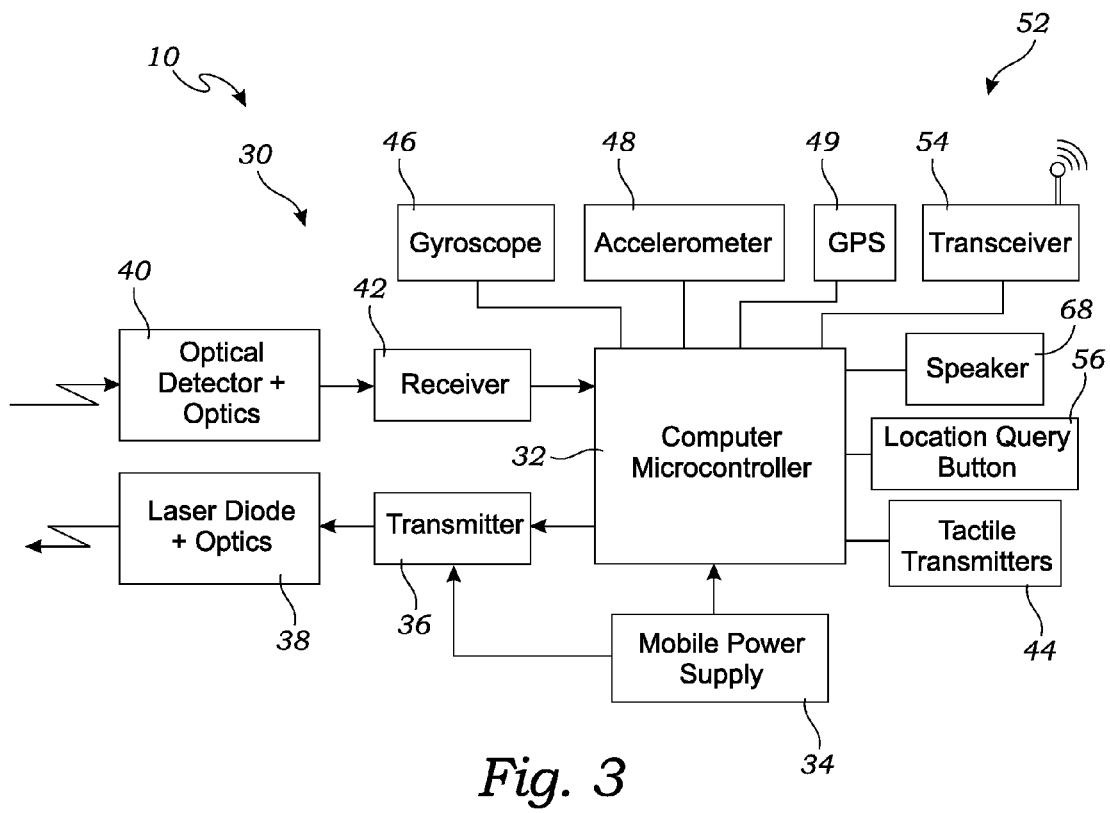
FIG. 3 is a block diagram of the electronic components of the mobility device.

FIG. 3 is a block diagram of the electronic components of the mobility device 10. As illustrated in FIGS. 1-3, the mobility device 10 includes a housing 20, in this case an elongate handle housing 20 having an outer surface 22 adapted to be grasped by the visually impaired person 12. In the present embodiment, the elongate handle housing 20 is generally cylindrical in shape is sized and formed to fit comfortably and securely in the hand of the visually impaired person 12, and may include an internal chamber 24 or equivalent structure for containing the electrical components of the mobility device 10, as described in greater detail below. Obviously, the housing 20 may be constructed in many shapes and sizes, and such alternative embodiments should be considered within the scope of the present invention.

In the embodiment of FIGS. 1-4, the mobility device 10 includes a laser detection apparatus 30 operably mounted in the internal chamber 24 of the handle housing 20, or in some other suitable location on or adjacent the elongate handle housing 20. The laser detection apparatus 30 is adapted for detecting the presence of the obstacle, and reporting the obstacle to the visually impaired person 12, in a manner similar to a standard cane.

In the current embodiment, the laser detection apparatus 30 may comprise a computer microcontroller 32, and a mobile power supply 34 (e.g., a battery) operably connected with the computer microcontroller 32. The term "computer microcontroller" is hereby defined to include any form of microcontroller known to those skilled in the art, and any other arrangement of processor(s) and memory suitable to the present invention as described herein.

A transmitter 36 is operably connected with the computer microcontroller 32, and also operably connected with a laser diode 38 for transmitting a laser pulse responsive to the transmitter 36. This may further include any additional forms of optics (not shown) suitable for directing the laser pulse, such as is well known in the art. The laser detection apparatus 30 further includes an optical detector 40 for receiving a reflected pulse reflected from the obstacle, and a receiver 42 operably connected with the optical detector 40 and also operably connected with the computer microcontroller 32 for transmitting a signal to the computer microcontroller 32 upon receipt of the reflected pulse, so that the computer microcontroller 32 can determine a distance that the laser pulse travelled before being reflected.

The mobility device 10 further includes a feedback mechanism 44 for informing the visually impaired person 12 of the object detected by the laser detection apparatus 30. In one embodiment, the feedback mechanism 44 includes a plurality of vibrating tactile transmitters 44 arrayed on the outer surface 22 of the handle for indicating to the visually impaired person 12 the distance to the obstacle from the laser detection apparatus 30. In this embodiment, the vibrating tactile transmitters 44 are arranged linearly under the user's thumb and down to the palm. In this arrangement, in one embodiment, vibrations in the vibrating tactile transmitters 44 near the end of the thumb would indicate something a significant distance from the visually impaired person 12 (i.e., at the end of a "virtual cane"), while closer objects would cause vibrations in the vibrating tactile transmitters 44 further up the user's thumb and palm.

Other arrangements of vibrating tactile transmitters 44 may be used to convey the necessary information. The tactile transmitters 44 could alternatively be arranged down other fingers, across the palm, or in other arrangements devised by one skilled in the art. Furthermore, other forms of feedback mechanisms may also be used (e.g., audio feedback, moving parts etc.), and any alternatives that may be selected by one skilled in the art should be considered within the scope of the present invention.

In one embodiment, the mobility device 10 may further include a gyroscope 46 and/or an accelerometer 48 (or accelerometers) operably connected with the computer microcontroller 32 for determining the movement of the device 10, the orientation that the device 10 is being held, and thereby an angle A of the laser pulse with respect to a ground surface. The specific movement of the mobility device 10, and changes in the angle A of the mobility device 10, may cause the laser detection apparatus 30 to receive a return from the ground surface, which may be mistaken for an obstacle. In this embodiment, the microprocessor functions to determine when the laser detection apparatus 30 is detecting a ground surface rather than an obstacle, based upon the angle A detected using the gyroscope 46.

In this embodiment, the visually impaired person 12 may need to perform a calibration procedure on level, unobstructed ground, holding the mobility device 10 in a natural position, and then pivoting it to different angles A, so that the mobility device 10 can determine the distance to the ground in different orientations, which will vary based upon a height H at which the mobility device 10 is held, which is primarily depending upon how tall the visually impaired person 12 is, and the manner in which the mobility device 10 is held.

Once the mobility device 10 has been calibrated, it is able to track its own movement and orientation using the gyroscope 46 and/or the accelerometer 48(s), and determine which readings from the laser detection apparatus 30 result from the ground, and which are from obstacles. When the ground is detected, it may either be ignored, or it may be reported via the vibrating tactile transmitters 44 via vibrations that are at a different rate and/or pattern, to indicate when the mobility device 10 is detecting the ground rather than the obstacle. This will enable the visually impaired person 12 to use the mobility device 10 in a manner similar to a standard cane, and confirm the location of the ground, while also perceiving obstacles that extend upwardly from the ground.

In the embodiment of FIG. 3, the mobility device 10 further includes a global positioning system ("GPS") 49 operably connected with the computer microcontroller 32 for determining a location of the mobility device 10. The GPS 49 may be integrated with the device 10, or it may be attached as a separate electronic component and operably connected via a cord and plug, or via a wireless connection The GPS 49 may provide mapping information, and/or information about nearby points of interest, such as are described in greater detail below.

Figure 4:
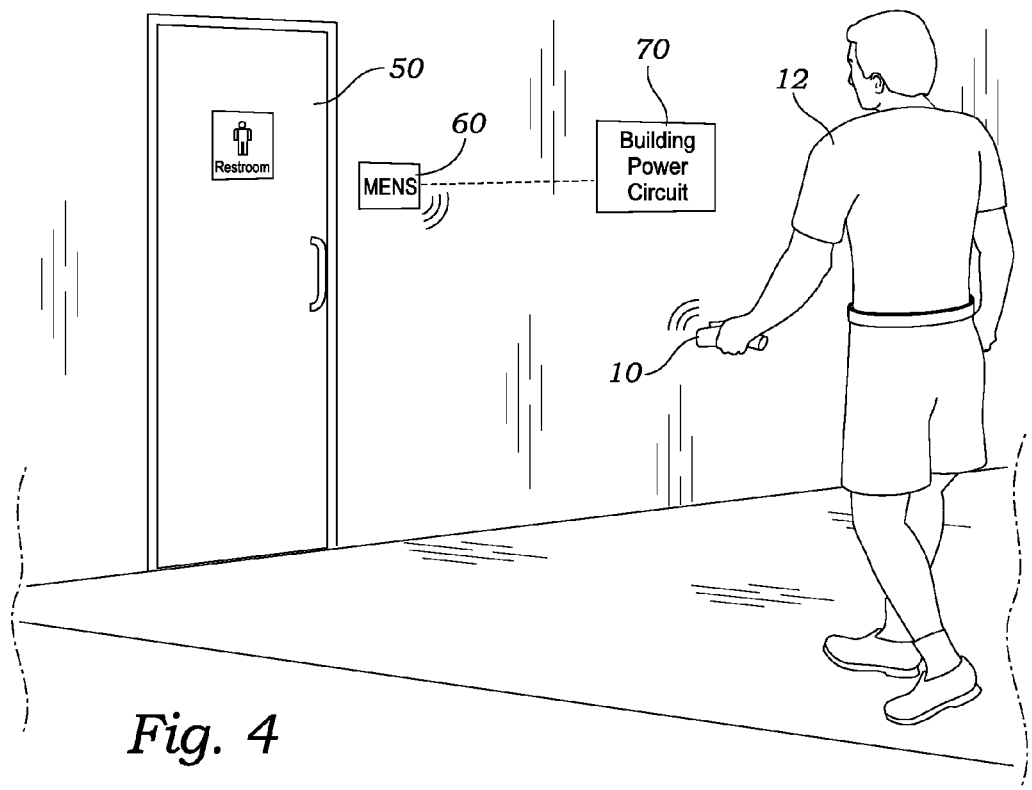
FIG. 4 is a perspective view of the visually impaired person using the mobility device to find a desired location, in this case an entrance to a male restroom, via an electronic beacon installed at the desired location.
Figure 5:
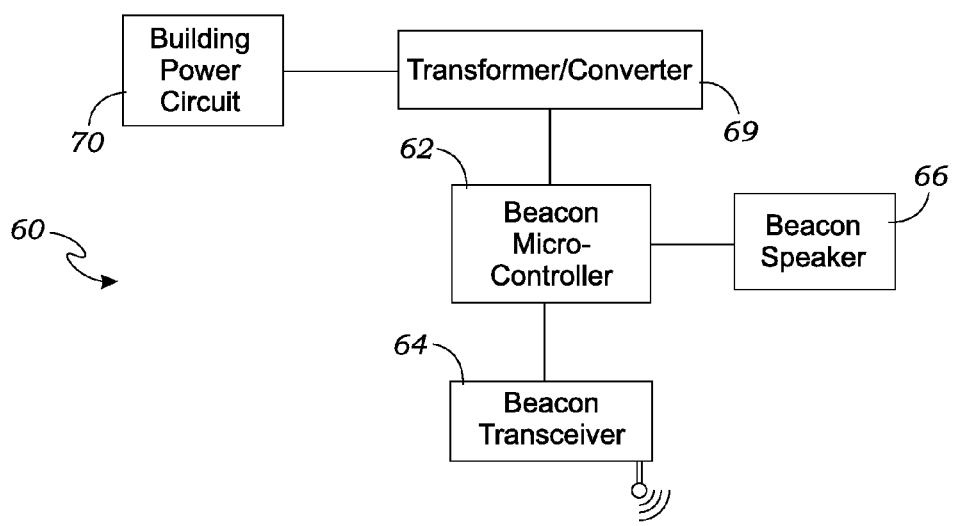
FIG. 5 is block diagram of one embodiment of the electronic beacon of FIG. 4.

FIG. 4 is a perspective view of the visually impaired person 12 using the mobility device 10 to find a desired location 50, in this case an entrance to a male restroom, via an electronic beacon 60 installed at the desired location 50. FIG. 5 is block diagram of one embodiment of the electronic beacon 60 of FIG. 4. As illustrated in FIGS. 4-5, the electronic beacon 60 is installed in a convenient location in or adjacent the desired location 50, to guide the visually impaired person 12 using the mobility device 10.

As illustrated in FIG. 2, the mobility device 10 of this embodiment further includes an electronic directing system 52 operably mounted in the handle housing 20 of the mobility device 10. In one embodiment, the electronic directing system 52 comprises a transceiver 54 operably connected with the computer microcontroller 32, and a location query button 56 operably positioned on the outer surface 22 of the elongate handle housing 20, for enabling the visually impaired person 12 to indicate his or her interest in finding the desired location 50.

The "transceiver" is hereby defined to include any form of transmitter device (optionally also including a receiver device) capable of transmitting a triggering signal a desired range, in this case about 20-50 yards, although this can vary greatly depending upon the specific embodiment being used. The "location query button 56" is hereby defined to include any form of lever, switch, button, voice trigger, or any other form of actuation known in the art suitable for actuating the electronic directing system 52.

As illustrated in FIG. 5, in one embodiment, the electronic beacon 60 includes a beacon microcontroller 62, a beacon transceiver 64, and a beacon speaker 66 for generating an audible signal. The electronic beacon 60 may include a transformer/converter 69 for receiving power from a building power circuit 70, if required. In this embodiment, the beacon transceiver 64 is defined to include any form of receiver device (optionally also including a transmitter device) capable of receiving a triggering signal and functioning at a desired range, in this case about 20-50 yards, although this can vary greatly depending upon the specific embodiment being used.

In use, the visually impaired person 12 actuates the location query button 56 when he or she wants to find the desired location 50. This may be pre-set (e.g., a male restroom, a female restroom, or other location(s)), or it may be selected from a list at any point in time using any form of interface known in the art and suitable for use by the visually impaired person 12. In this embodiment, the device is pre-set to search for a male restroom, so the visually impaired person 12 need only press the location query button 56.

Once the location query button 56 has been pressed, the computer microcontroller 32 functions to send the trigger signal from the transceiver 54 of the mobility device 10 to the beacon transceiver 64 of the electronic beacon 60. Upon recognition of the trigger signal, the electronic beacon 60 begins to emit a directing signal to guide the visually impaired person 12. In one embodiment, the directing signal is an audible signal (e.g., beeping, or other suitable audible cue) from the beacon speaker 66 to guide the visually impaired person 12 to the electronic beacon 60 and the desired location 50. In another embodiment, the directing signal may be an electromagnetic signal that can be received by the mobility device 10 so that the mobility device 10 may guide the visually impaired person 12 to the desired location 50 (e.g., via audible directions, or vibrations from the vibrating tactile transmitters 44, or other method).

In one embodiment, the beacon transceiver 64 of electronic beacon 60 transmits a proximity signal the receipt of which by the mobility device 10 indicates that the electronic beacon 60 is within range, and the mobile device includes an indicator 68 for indicating that the electronic beacon 60 is within range. In one embodiment, the indicator 68 is a speaker 68 for audibly indicating that the desired location 50 is in range. The speaker 68 may be operably mounted in the handle housing 20.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

What is claimed is:

1. A mobility device for directing a visually impaired person past an obstacle, the mobility device comprising:
    an elongate handle housing having an outer surface adapted to be grasped by the visually impaired person; and
    a laser detection apparatus operably mounted in the handle housing of the mobility device for detecting the presence of the obstacle, the laser detection apparatus comprising:
        a computer microcontroller;
        a mobile power supply operably connected with the computer microcontroller;
        a transmitter operably connected with the computer microcontroller;
        a laser diode operably connected with the transmitter for transmitting a laser pulse responsive to the transmitter;
        an optical detector for receiving a reflected pulse reflected from the obstacle;
        a receiver operably connected with the optical detector and also operably connected with the computer microcontroller for transmitting a signal to the computer microcontroller upon receipt of the reflected pulse, so that the computer microcontroller can determine a distance that the laser pulse travelled before being reflected;
        a plurality of vibrating tactile transmitters arrayed on the outer surface of the handle for indicating to the visually impaired person the distance to the obstacle from the laser detection apparatus; and
        a gyroscope operably connected with the computer microcontroller for determining an angle of the laser pulse with respect to a ground surface wherein the computer microcontroller functions to determine when the laser detection apparatus is detecting a ground surface rather than an obstacle, based upon the angle detected using the gyroscope, and wherein the vibrating tactile transmitters vibrate at a different rate, or in a different pattern, or both, to indicate when the mobility device is detecting the ground rather than the obstacle.

2. The mobility device of claim 1, further comprising a global positioning system operably connected with the computer microcontroller for determining a location of the mobility device.

3. The mobility device of claim 1, further comprising an accelerometer operably connected with the computer microcontroller for determining the movement of the mobility device.

4. A mobility device for directing a visually impaired person past an obstacle, the mobility device comprising:
    an elongate handle housing having an outer surface adapted to be grasped by the visually impaired person; and
    a laser detection apparatus operably mounted in the handle housing of the mobility device for detecting the presence of the obstacle, the laser detection apparatus comprising:
        a computer microcontroller;
        a mobile power supply operably connected with the computer microcontroller;
        a transmitter operably connected with the computer microcontroller;
        a laser diode operably connected with the transmitter for transmitting a laser pulse responsive to the transmitter;
        an optical detector for receiving a reflected pulse reflected from the obstacle;
        a receiver operably connected with the optical detector and also operably connected with the computer microcontroller for transmitting a signal to the computer microcontroller upon receipt of the reflected pulse, so that the computer microcontroller can determine a distance that the laser pulse travelled before being reflected; and
        a plurality of vibrating tactile transmitters arrayed on the outer surface of the handle for indicating to the visually impaired person the distance to the obstacle from the laser detection apparatus;
        an accelerometer operably connected with the computer microcontroller for determining the movement of the mobility device;
        a gyroscope operably connected with the computer microcontroller; and
        wherein the computer microcontroller is programmed to enter a calibration process that utilizes the accelerometer and the gyroscope to determine the movement and orientation of the mobility device to determine when the laser detection apparatus is detecting a ground surface and when it is detecting an obstruction.

5. The mobility device of claim 4, further comprising a global positioning system operably connected with the computer microcontroller for determining a location of the mobility device.

\* \* \* \* \*